United States Patent [19]
Ege

[11] Patent Number: 5,427,038
[45] Date of Patent: Jun. 27, 1995

[54] ADJUSTABLE GAUGE WHEEL FOR A PLANTER

[75] Inventor: Frank E. Ege, Moline, Ill.

[73] Assignee: Deere & Company, Moline, Ill.

[21] Appl. No.: 218,095

[22] Filed: Mar. 25, 1994

[51] Int. Cl.⁶ ............................................. A01C 5/06
[52] U.S. Cl. ...................................... 111/137; 111/69;
    111/164; 111/168; 111/193; 172/736; 172/740;
    172/748; 172/762
[58] Field of Search ............... 111/193, 137, 135, 134,
    111/69, 163, 168, 164; 172/536, 681, 684, 684.5,
    734, 736, 739, 740, 748, 762

[56] References Cited
U.S. PATENT DOCUMENTS

| 2,685,243 | 8/1954 | Cole | 111/137 X |
| 4,009,668 | 3/1977 | Brass et al. | 172/538 X |
| 4,493,617 | 1/1985 | Brady et al. | 417/214 |
| 4,959,991 | 10/1990 | Andersson | 72/457 |
| 5,074,227 | 12/1991 | Schwitters | 111/137 |
| 5,235,922 | 8/1993 | Deckler | 111/137 |
| 5,269,380 | 12/1993 | Lofquist et al. | 111/135 X |

FOREIGN PATENT DOCUMENTS 2415420  8/1979  France .................. 111/135

OTHER PUBLICATIONS

John Deere Operator's Manual OM-H138100 Issue F8 entitled "7300 Vertical-Fold MaxEmerge 2 Planters", cover and pp. 120–127, published in U.S.A.

Primary Examiner—Randolph A. Reese
Assistant Examiner—Christopher J. Novosad

[57] ABSTRACT

An agricultural planting machine has a pair of adjacent furrow opening disks that form a V-shaped furrow as the machine advances and a pair of ground engaging gauge wheels respectively mounted for rotation adjacent the opposite sides of the opening disks. The gauge wheels are journaled on the lower ends of a pair of arms having their upper ends attached to the planter frame by mechanisms that permit easy lateral adjustment of the arms to optimize the close spacing between the gauge wheels and the opening disks. Each adjusting mechanisms includes an externally threaded bushing mounted on a shaft and engaging an internally threaded bore in the gauge wheel arm so that rotation of the bushing laterally shifts the arm and the gauge wheel mounted thereon. A locking device is operative between the bushing and the shaft to selectively lock the adjusting mechanism in the desired position.

2 Claims, 2 Drawing Sheets

ADJUSTABLE GAUGE WHEEL FOR A PLANTER

BACKGROUND OF THE INVENTION

This invention relates to an agricultural planting machine and more particularly to a planting machine having a pair of rotating disks that open a furrow in which the seeds are deposited as the machine advances and a pair of gauge wheels on opposite sides of the furrow opening disks that control the depth of the furrow opened by the disks.

A machine of the above general type is shown in U.S. Pat. No. 4,009,668, which is also assigned to the assignee of the present invention.

In such a machine, it is desirable to have the gauge wheels positioned on the opposite sides of the furrow opening disk in a close relationship to accurately gauge the depth of the furrow and to prevent the build-up of dirt or trash between the gauge wheels and the opener disk. Due to the wear of the machine, it is sometimes necessary to adjust the position of the gauge wheels to maintain the close relationship of the wheels with the opening disks. For that purpose, it is known to provide shims or spacer washers on the opposite side of the arm that rotatably supports the gauge wheels, the upper end of the arm being mounted on a generally transverse shaft so that the lateral position of the gauge wheel relative to the adjacent disk can be adjusted by removing the bolt that holds the gauge wheel arm on the shaft and adding or subtracting the washers or shims adjacent the upper end of the gauge wheel arm until the desired minimum clearance between the gauge wheel and the side of the furrow opening disk is achieved. The above procedure, of course, may be somewhat difficult and time consuming, since to make the adjustment, the gauge wheel arm and the gauge wheel mounted thereon must be removed to add or subtract the washers or shims.

SUMMARY OF THE INVENTION

According to the present invention, an improved means is provided for adjusting the position of the gauge wheel relative to the furrow opening disk. More specifically, an exteriorly threaded bushing is interposed between the gauge wheel arm and the shaft the arm having an internal thread that engages the external thread on the bushing. The bushing is selectively locked to the shaft, and when unlocked, the position of the gauge wheel arm and consequently of the gauge wheel is easily adjusted by simply rotating the bushing until the gauge wheel achieves its desired position, after which the bushing can again be locked to the shaft to hold the position of the gauge wheel in the desired location.

An important feature of the invention resides in its simple inexpensive construction. Another important feature of the invention resides in the fact that the adjustment can be easily accomplished in the field with a minimum amount of tools, so that the operator is not discouraged from adjusting the gauge wheel to opener relationship to its optimum position.

DESCRIPTION OF THE PREFERRED EMBODIMENT

Figure 1:
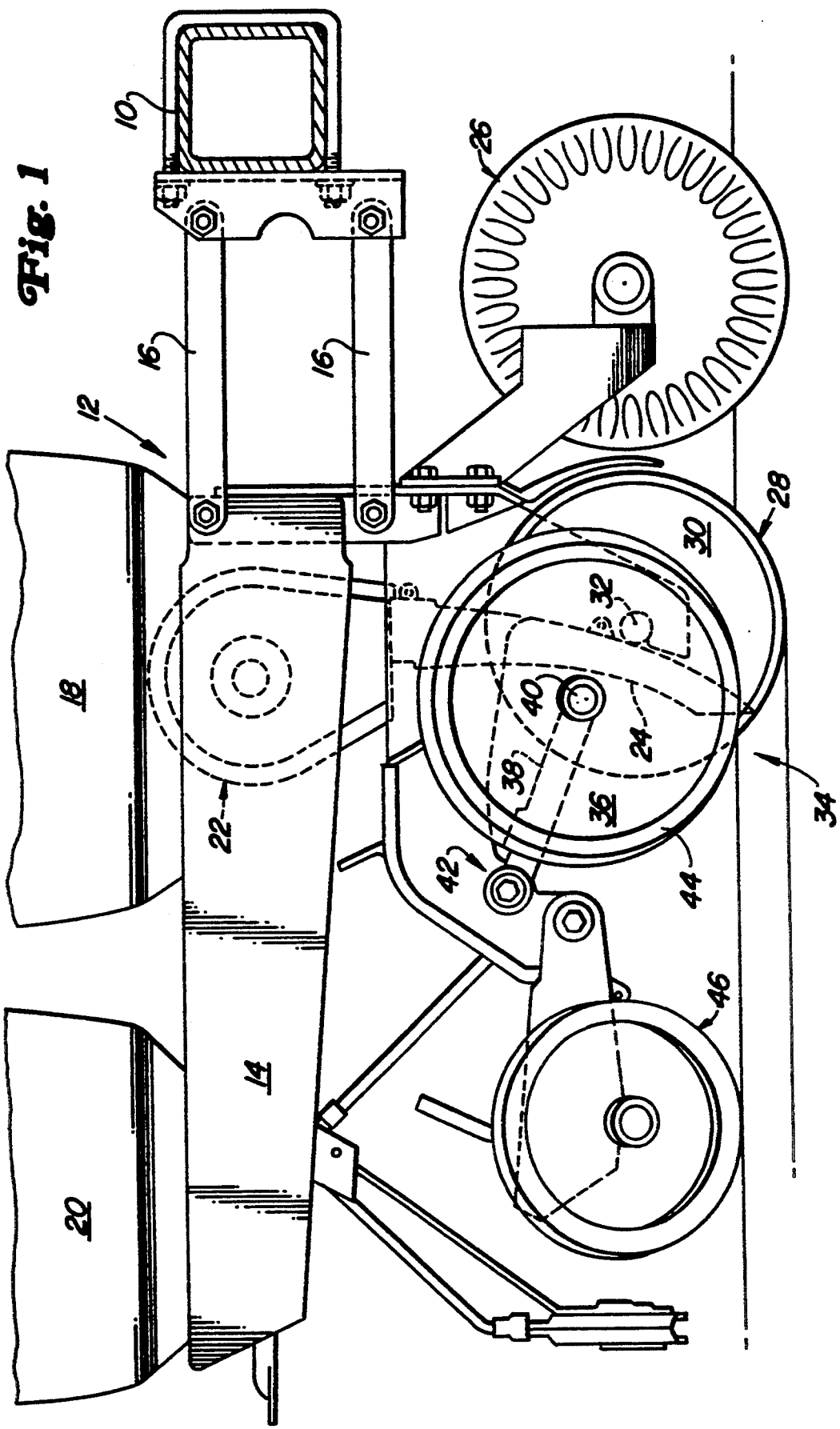
FIG. 1 is a somewhat schematic side elevation view of one row unit of a planter embodying the invention.

The invention is embodied in an agricultural planter having a mobile main frame 10, only a portion of which is illustrated in FIG. 1. As is well known, frame 10 is conventionally attached to and towed by a tractor, and a number of individual row units, indicated generally by the numeral 12, are spaced at intervals along the main frame 10. Each row unit includes a row unit frame, indicated in its entirety by the numeral 14, the row unit frame of each row unit being independently vertically adjustable relative to the main frame by a pair of fore and aft links 16. Only a single row unit is shown and described herein, and, as is conventional, each row unit includes a seed hopper 18 and a fertilizer hopper 20 mounted on the row unit frame 14. Each row unit has a seed selection mechanism 22 that receives seed from the seed hopper and discharges them downwardly through a seed tube 24 at regular intervals.

A tillage device 26 is mounted on the row unit frame forwardly of a furrow opening device, indicated in its entirety by the numeral 28. The furrow opening device 28 comprises a pair of generally vertical disks 30 that rotate on generally horizontal transverse shafts 32. The axes of the respective disks 30 are slightly inclined relative to one another so that the disks contact one another forwardly and below the disk axes. In operation, the lower portion of the furrow opening disks are disposed below ground level so that the disks form a V-shaped groove or furrow as the machine advances. All the above is described in greater detail in U.S. Pat. No. 4,009,668. As is apparent, the seed tube 24 deposits the seed in the furrow behind the axis of the furrow opening disk 30.

Figure 2:
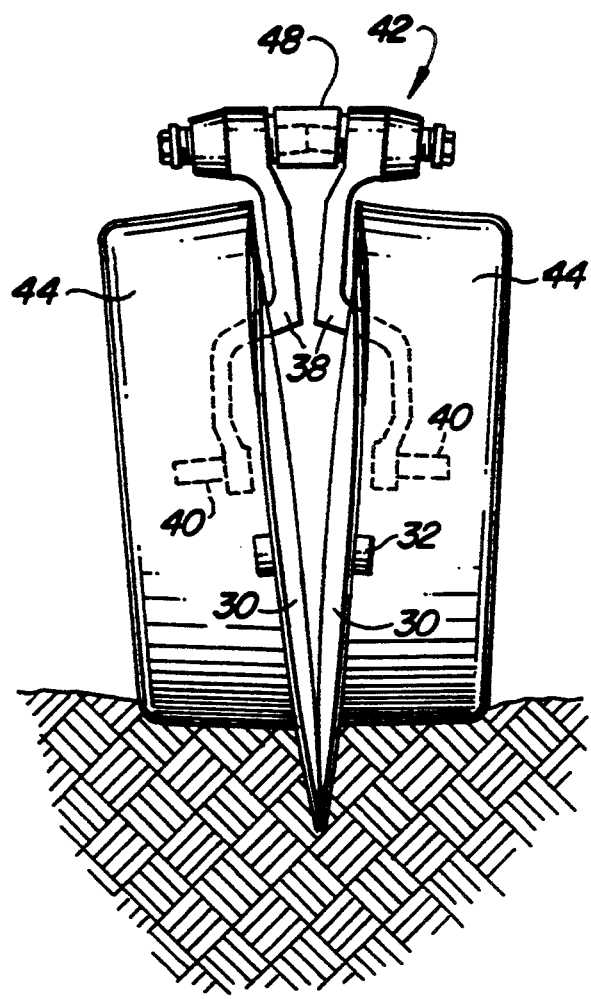
FIG. 2 is a somewhat schematic front view of the furrow opening disk and adjacent gauge wheels in an operating position.
Figure 3:
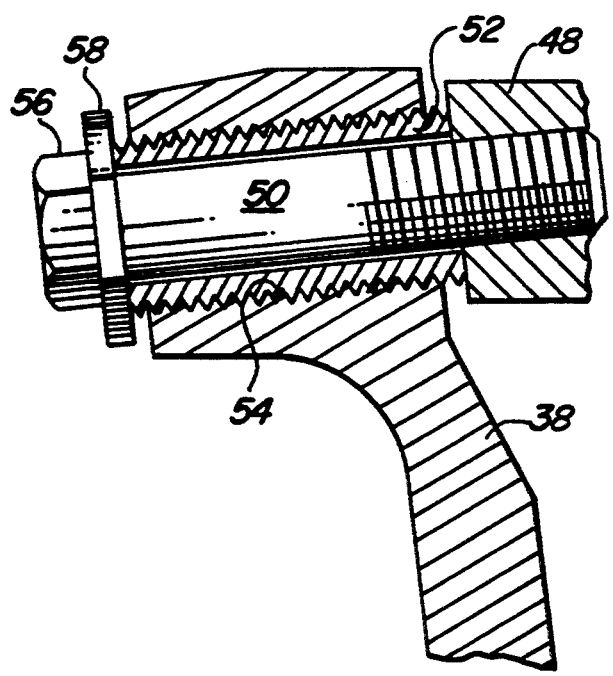
FIG. 3 is an enlarged vertical sectional front view of the adjusting mechanism for one of the gauge wheels.

A gauge wheel assembly, indicated in its entirety by the numeral 34 is mounted on the row unit frame adjacent the furrow opening device and includes a pair of gauge wheels 36 respectively disposed adjacent the outer sides of the furrow opening disks 30. The gauge wheels 36 are respectively mounted at the lower ends of upwardly and rearwardly inclined arms 38 via shafts 40 that rotatably support the respective gauge wheels. The upper ends of the arms 38 are connected to the row unit frame by means of an upper arm mounting structure indicated generally by the numeral 42. The gauge wheels are conventionally provided with rubber tires 44 around their periphery, and the tires present a relatively flat ground engaging surface. As is apparent, the axes of the gauge wheel shafts 40 are generally parallel to the axes of the adjacent furrow opening disk shafts 32, the shafts 40 being spaced rearwardly of the shafts 32. As is well known, an adjustable stop (not shown) operates between the row unit frame and the gauge wheel arm to limit the upward movement of the gauge wheel relative to the frame. Since the gauge wheels ride on the surface of the ground when the machine is in operation, the vertical position of the gauge wheels relative to the disk controls the depth of the furrow opened by the disks, as best seen in FIG. 2. The inner edges of the gauge wheel tires 44 lightly engage or are very closely spaced from the outer side of the adjacent furrow opening disks, adjacent to the point where the disk leave the ground, rearwardly of the disk shafts 32 but forwardly of the gauge wheel shafts 40. The close spacing of the gauge wheel tire to the outer surface of the disk cleans the disk and prevents the buildup of trash and dirt between the gauge wheel and the disk. The close spacing of the gauge wheel to the furrow opening device also accurately gauges the depth of the furrow formed by the furrow opening device. A furrow closure mechanism 46 is also mounted on the row unit frame immediately behind the gauge wheel assembly.

The gauge wheel mounting structure 42 includes a center support 48 attached to the row unit frame 14 and a pair of generally horizontal shafts 50 extend outwardly from the opposite sides of the support 48. The shafts 50 are formed by large bolts threaded in bores in the support 48 and are inclined slightly downwardly from the support 48 so that the axis of each shaft 50 is generally parallel to the axis of the gauge wheel mounting shaft 40 at the lower end of each arm 38. An externally threaded bushing 52 is mounted on each shaft 50 with the inner end of the bushing abutting the center support 48. The upper end of each gauge wheel arm 38 is provided with an internally threaded bore 54 that mates with the externally threaded surface on the bushing. Thus, rotation of the bushing 52 on the shaft 50 moves the upper end of the arm inwardly or outwardly according to the direction of rotation of the bushing.

The outer end of the bolt type shaft 50 is provided with a conventional bolt head 56. As is apparent, when the bolt type shaft is tightened, the bolt head 56 bears against the end of the bushing 50 to tightly clamp the bushing against the center support, locking the bushing against rotation relative to the shaft. When the bolt type shaft 50 is loosened, the bushing 52 is free to rotate on the shaft 50. The end of the bushing 52 outwardly of the gauge wheel arm is preferably provided with a hex head 58 that facilitate turning of the bushing by a readily available wrench or similar tool. Thus, the lateral position of the upper end of the gauge wheel arm and consequently the position of the gauge wheel relative to the furrow opening disk can be readily adjusted by simply loosening the shaft 50 and turning the bushing 52 to shift the arm to its desired position.

I claim:

1. In an agricultural planting machine having a frame, a pair of opposite furrow forming disks rotatably mounted on the frame on intersecting axes so that the disks diverge upwardly from a point of contact below the axes of the disks, and a pair of gauge wheel assemblies mounted on the frame respectively adjacent the opposite sides of the pair of furrow forming disks, each gauge wheel assembly including a gauge wheel journaled on one end of an arm for rotation about an axis rearwardly of and generally parallel to the axis of the adjacent disk, an improved means for adjustably mounting the other end of each gauge wheel arm to the frame and comprising:
   a cylindrical shaft mounted on the frame and having an axis generally parallel to the axis of the gauge wheel;
   an externally threaded bushing rotatably mounted on the shaft;
   an internally threaded bore in said other end of the arm and threadably mounted on the bushing so that rotation of the bushing on the shaft moves the arm in an axial direction relative to the shaft to adjust the lateral spacing of the gauge wheel from the adjacent disk; and
   locking means for selectively locking the bushing to the shaft to prevent rotation of the bushing.

2. The invention described in claim 1 wherein one end of the shaft is threadable into the frame and the other end is provided with a head that bears against the end of the bushing when the shaft is threaded into the frame, so that the shaft and head form the locking means that locks the bushing to the shaft.

* * * * *